United States Patent
Johnson

[15] 3,642,506
[45] Feb. 15, 1972

[54] METHOD FOR IMPROVING THE PROPERTIES OF HYDRAULIC CEMENTITIOUS MIXTURES

[72] Inventor: Keith L. Johnson, Matteson, Ill.
[73] Assignee: Swift & Company, Chicago, Ill.
[22] Filed: Nov. 28, 1969
[21] Appl. No.: 880,928

Related U.S. Application Data

[63] Continuation-in-part of Ser. No. 565,482, July 15, 1966, abandoned.

[52] U.S. Cl. .................................. 106/90, 106/86, 106/88, 106/97, 106/314
[51] Int. Cl. ................................................ C04b 13/26
[58] Field of Search ....................... 106/86, 88, 90, 97, 314

[56] References Cited

UNITED STATES PATENTS

| | | | |
|---|---|---|---|
| 2,859,182 | 11/1958 | Carroll | 252/529 |
| 2,943,058 | 6/1960 | Cook | 252/153 |
| 3,197,509 | 7/1965 | Drew | 260/583 |
| 3,202,714 | 8/1965 | Zimmerer et al. | 260/584 |
| 3,223,647 | 12/1965 | Drew et al. | 252/528 |
| 3,287,145 | 11/1966 | Fischer | 106/90 |
| 3,377,180 | 4/1968 | James | 106/287 |

FOREIGN PATENTS OR APPLICATIONS

| | | |
|---|---|---|
| 520,015 | 12/1955 | Canada |
| 799,071 | 7/1958 | Great Britain |

*Primary Examiner*—Daniel E. Wyman
*Assistant Examiner*—W. T. Scott
*Attorney*—Edward T. McCabe and W. C. Davis

[57] ABSTRACT

A method of improving the workability and compressive strength of concrete by the addition of from about one-half to about 1¼ fluid ounces per 94 pound sack of cement of a cementitious admixture including a surface active agent made up of primary polyglycolamides, tertiary amide oxides and mixtures thereof; an anionic detergent; and a solvent.

16 Claims, 3 Drawing Figures

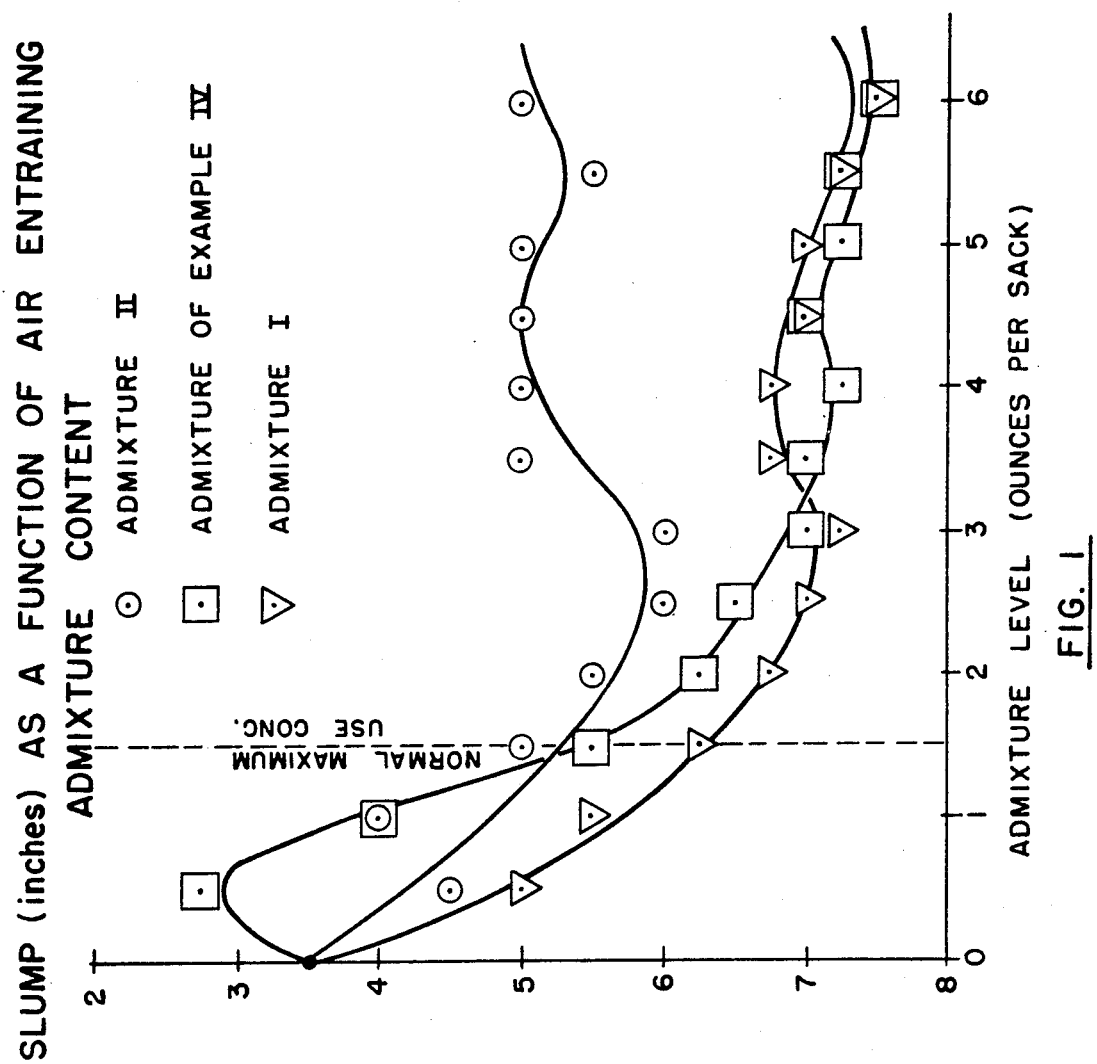

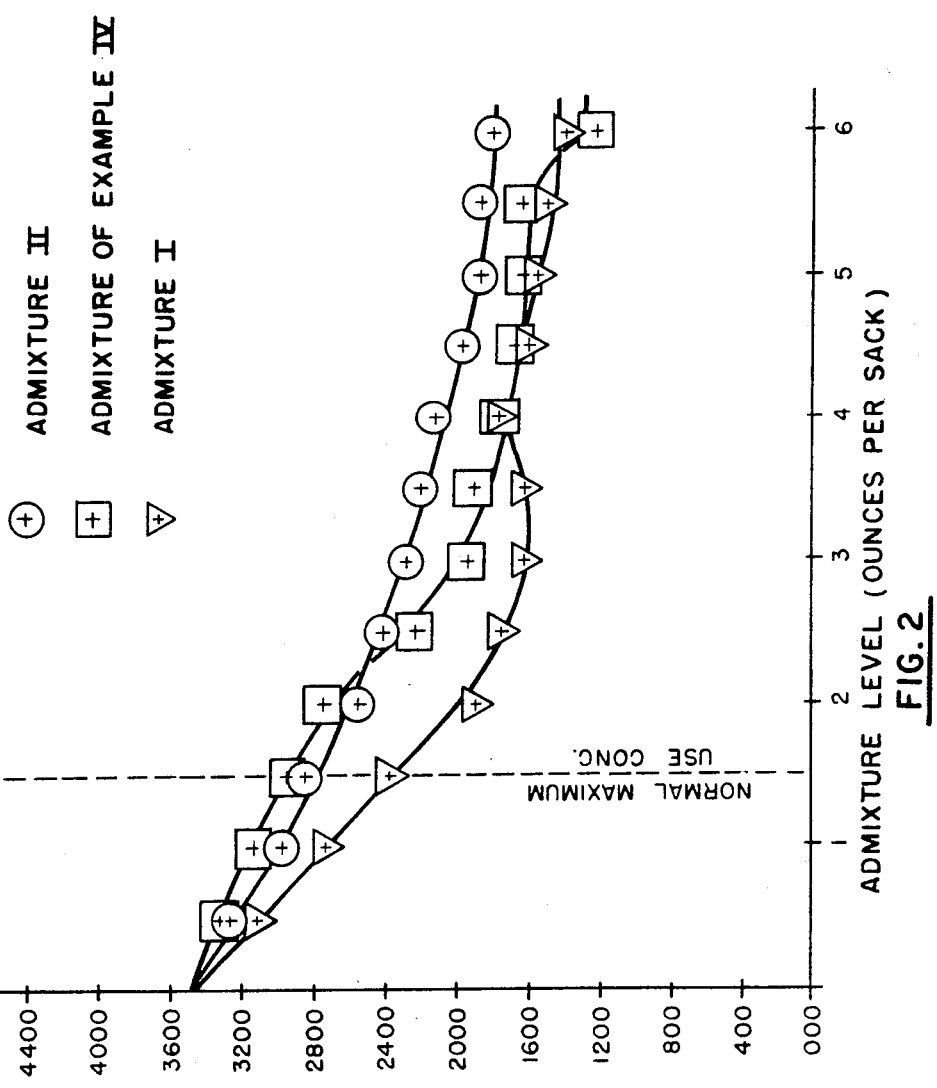

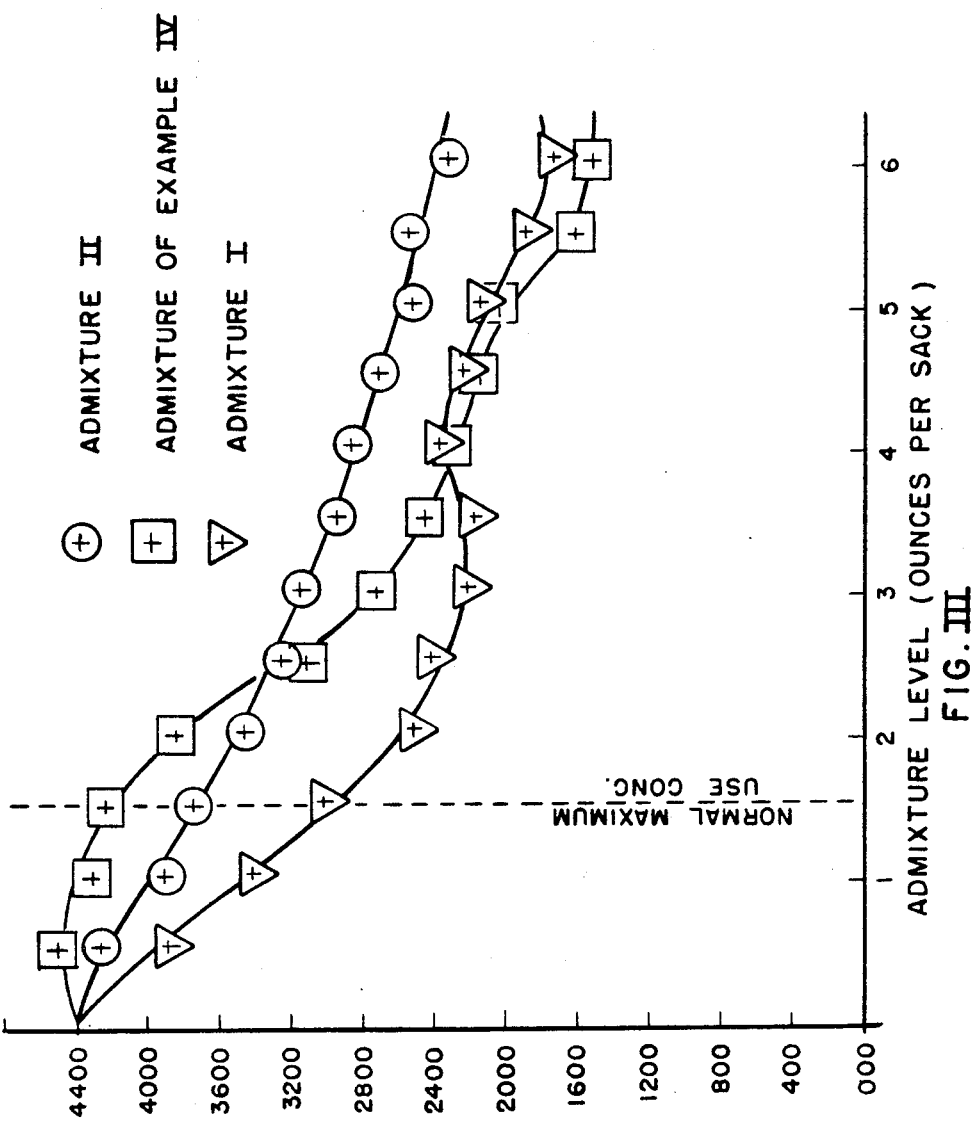

METHOD FOR IMPROVING THE PROPERTIES OF HYDRAULIC CEMENTITIOUS MIXTURES

This is a continuation-in-part of application Ser. No. 565,482, filed July 15, 1966 and now abandoned.

This invention relates to additive compositions for incorporation into hydraulic cement mixes and mortars, to a method for modifying the properties of such mixes and mortars, and to the resultant hydraulic cement mixes and concrete containing the additive compositions.

Concrete is used in structures and pavements that are expected to have a long life and low upkeep. In concrete exposed to varying atmospheric conditions, one of the essential requirements is high resistance to freezing, thawing and humidity variation. The most destructive of these forces of weathering is freezing and thawing action while concrete is wet or moist. The expansion and contraction of the water within the concrete as it is converted to and from ice, mechanically weakens the structure and permits erosion or spalling.

Freeze-thaw stability can be improved by using a concrete of high quality. One of the manifestations of quality concrete is that the mix is made with a small amount of water. Concretes made with a small amount of water are much more resistant than those made with larger amounts of water, yet each blend of concrete has to be blended to a predetermined "slump." This "slump" is measured by taking a cylinder of unset concrete and removing the casing and observing how far the top of the cylinder of concrete falls in a given period of time.

A second manner of improving the freeze-thaw resistance and weathering resistance is to incorporate small amounts of soaplike materials into the cement. When the cement is mixed with water a large number of microscopic air bubbles are produced by the soaplike material and become entrained in the cement paste. The bubbles relieve the internal pressure created when water freezes in the pores of the concrete. A number of air-entraining admixtures are now being commercially marketed for this particular use.

An auxiliary function of most air-entraining agents is to increase the workability (placeability) of the hydraulic mixes. Surface tension depressing agents added to concrete and other hydraulic mixes increase the workability of the mix thereby allowing use of lower water to cement ratios. Low water-to-cement ratios are desirable because they produce quality high-strength concrete.

A wide variety of materials have been suggested and commercially used in air-entraining admixtures. These additives have been used to decrease costs by reducing the amount of cement in the mixes while retaining desired physical properties. They have also been used in highway and airport runway construction where durability rather than cement cost is probably the primary design consideration.

A problem involved in the use of air-entraining and/or plasticizing agents has been the tendency of the compressive strength of the concrete to decrease with increasing air content. If the components of a concrete mix other than the amount of air-entraining agent are kept at fixed values, it has been found that each percentage increase in the amount of air above the amount which normally exists in normal concrete reduces the compressive strength of the concrete 3 to 4 percent. Although some air-entraining agents have been found which result in somewhat improved compressive strengths as compared to normal concrete, there remains a need for air-entraining agents which substantially increase the compressive strength of concrete.

For many applications it is desirable to add the air-entraining agent in liquid form diluted in a solvent. Addition in fluid form aids in obtaining uniform distribution of the agent throughout the mix. A homogeneous mix is necessary to avoid excessive air concentrations in some areas of the hydraulic mix. However, field results using fluid air-entraining mixtures have occasionally turned out to be unsatisfactory for no ascertainable reason other than a possible failure of the admixture ingredients to perform properly.

It is therefore an object of the invention to provide a method for improving the workability of hydraulic cement mixes, and for improving the freeze-thaw resistance and strength of the resulting concrete.

Another object of the invention is to provide novel admixtures which will improve the workability of hydraulic cement mixes and will improve the freeze-thaw resistance and strength of the resulting concrete.

A further object of the invention is to provide for improved high-strength concretes containing entrained air.

Another object of the invention is to provide easily dispersed fluid admixtures for hydraulic cement mixes which give reproducible field results including desirable levels of air entrainment and compressive strength.

In general, this invention relates to an improved admixture in cementitious mixtures comprising at least two surface active ingredients. The first component consists of primary polyglycolamides, tertiary amine oxides or mixtures thereof. The second component is an anionic detergent. It has been discovered that admixtures containing primary polyglycolamides unexpectedly give superior strength concrete at desirable levels of air-entrainment. Dilute-fluid mixtures containing either a primary polyglycolamide, a tertiary amine oxide or mixtures thereof give excellent workability to hydraulic mixes and give reproducible field results.

In the preferred form of the invention from about ½ to about 1½ ounces of fluid admixture are used per sack of cement (94 pounds). This corresponds to from about 0.01 to 0.03 ounces of the primary amides, amine oxides or mixtures thereof per sack of cement (94 pounds) and includes sufficient solvent (water) to disperse the agents throughout the mix. The admixture may broadly contain from 1 to 20 parts and preferably contains by weight from 1 to 5 parts of amine oxide or primary amide, broadly from 2 to 30 parts and preferably from 2 to 20 parts of anionic detergent and from 40 to 96 parts of solvent which may be water or an organic water-soluble solvent such as monopropylene glycol monomethyl ether, dipropylene glycol monomethyl ether, tripropylene glycol monomethyl ether, mixtures thereof or isopropyl alcohol. Because of the obvious economic considerations involved, it is generally preferable to restrict the amount of organic water-soluable solvent to a minor portion or less than 50 percent of the amount of water, with the water constituting a major portion or more than 50 percent of the solvent. Admixtures formulated as described above are easily dispersed throughout the mix and are unexpectedly stable. However, the active agents may be added to the mix in a convenient manner such as by adding them to the mixing water or to a part of the mixing water.

The primary amides useful in this invention may be prepared by reacting the nonhydroxy fatty acids of coconut oil with polyglycolamines. The polyglycolamine reactants useful in this invention are characterized by a primary amine group and a polyoxy containing aliphatic substituent. Specific examples of useful polyglycolamine reactants include the commercially available "polyglycolamine H-163" (which has the structure of diethylene isopropyl glycolamine:

$$NH_2-CH_2CH-O-CH_2CH_2-O-CH_2CHOH)$$
$$|$$
$$CH_3$$

and diglycolamine (which has the structure:

$NH_2-CH_2CH_2-O-CH_2CH_2-OH$).

The reaction conditions for preparing the primary amide will vary according to the volatility of the amide and the activity of the materials under consideration. Generally, temperatures from 120° to 200° C. and pressures from 27 to 29 of mercury vacuum at the lower temperatures to as high as 10 atmospheres at the upper end of the temperature range are feasible. If a catalyst, such as a soda amide or sodium methylate or other alkali metal alkoxylate is used, the temperature of the reaction can be as low as 50° to 70° C. Reaction times vary from about 15 minutes to about 4 hours depending upon the reaction conditions and reactants employed. The reaction is stoichiometric so approximately equal mole ratios of fatty acids of coconut oil and amine may be used although it is sometimes preferable to add an excess of polyglycol amine for subsequent condensation with sulfonic acid.

The amine oxides which are usable in the invention comprise an oxide of a tertiary amine having from 10–18 carbon atoms in one alkyl chain and having a total of from 2–10 carbon atoms in the other alkyl substituents. These amine oxides are commercially available.

The primary amides and amine oxides which are described above show outstanding resistance to hydrolysis in the presence of water. This stability is felt to be a factor which allows storage and sale of these modifying agents in dilute aqueous solution with resulting reproducible field results using mixing water of various hard water salt concentrations.

The anionic detergent used in the invention may in general be any anionic hydrocarbon compound which acts as a wetting and air-entraining agent. Preferred anionic detergents are the alkali metal or amine salts of alkyl aryl sulfonic acids wherein the aryl radical is selected from the group consisting of benzene and naphthalene and the alkyl group or groups have from 9–20 carbon atoms per group. The alkyl groups may be straight or branch chain. The salts may be obtained by any of the methods known to the art including in situ neutralization of excess amine from preparation of the primary amide. Other anionic detergents which are usable in the invention include salts of alkyl sulfates and alkyl ether sulfates.

The following examples are given for the purpose of illustrating the invention and are not to be construed as limiting the scope of the invention.

EXAMPLE I

A. Surface active agents were prepared from the following ingredients: 18 parts lauryl di(2-hydroxyethyl) amine oxide; 18 parts coconut oil fatty acids; 30 parts "polyglycolamine H-163" (which has the structure

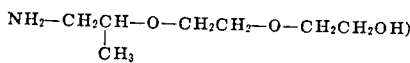

$NH_2-CH_2CH-O-CH_2CH_2-O-CH_2CH_2OH$)
     |
     $CH_3$ 30 parts diethanolamine; and 39 parts dodecylbenzene sulfonic acid. The following procedure was used: The coconut oil fatty acids were reacted with the "polyglycolamine H-163" in a four-neck, 1-liter glass reaction flask under 27 Hg. vacuum at 150° C. for 3 hours, then cooled to 70° C. and the lauryl di(2-hydroxy ethyl) amine oxide and diethanolamine and dodecylbenzene sulfonic acids were added with mixing. Five percent of the detergent prepared as outlined above, 5 percent isopropyl alcohol and 90 percent Chicago tapwater were combined to form admixture A.

B. A second admixture was prepared using the method of A above and the following ingredients: 18 parts lauryl di(2-hydroxy ethyl) amine oxide; 18 parts coconut oil fatty acids; 30 parts "polyglycolamine H-163"; 30 parts diethanolamine; and 39 parts tridecylbenzene sulfonic acid. The same procedure was followed as in part A above. Five percent of the detergent prepared as above, 5 percent of a mixture of monopropylene glycol monomethyl ether, dipropylene glycol monomethyl ether and tripropylene glycol monomethyl ether and 90 percent Chicago tapwater were combined to form admixture B.

C. A third admixture was prepared from: 36 parts coconut oil fatty acids; 30 parts "polyglycolamine H-163"; 30 parts diethanolamine; and 39 parts tridecylbenzene sulfonic acid. The following procedure was used: The coconut oil fatty acids and "polyglycolamine H-163" were reacted in a four-neck, 1-liter flask at a temperature of 150° C. for a 3-hour period under 27 Hg. vacuum. The condensate was then cooled to 70° C. and the tridecylbenzene sulfonic acid was then added along with the diethanolamine. Five percent of the detergent prepared as outlined above, 5 percent dipropylene glycol monomethyl ether and 90 percent Chicago tapwater were combined to form admixture C.

D. The admixtures prepared as above were incorporated into hydraulic cement mixes. The mixes contained the following ingredients and exhibited the following properties:

MIX DESIGNATIONS

| | | | |
|---|---|---|---|
| Cement—portland type I, lbs | 517.00 | 517.00 | 517.00 |
| Fine aggregate sand, lbs | 1,265.00 | 1,286.00 | 1,281.00 |
| Coarse aggregate gravel, lbs | 1,938.00 | 1,967.00 | 1,962.00 |
| Admixture A. fl. oz | 5.25 | | |
| Admixture B, fl. oz | | 5.50 | |
| Admixture C, fl. oz | | | 5.50 |
| Water (added), gals | 28.33 | 26.68 | 26.68 |
| Slump (consistency), in | 3.00 | 3.00 | 3.00 |
| Air content, percent by volume | 5.70 | 5.40 | 5.60 |
| Weight of fresh concrete, lbs. per cu. ft | 146.52 | 147.87 | 147.50 |
| Concrete produced (yield), cu. ft | 27.00 | 27.00 | 27.00 |
| Cement factor, sacks per cu. yd | 5.50 | 5.50 | 5.50 |
| Water cement ratio by wt | 0.46 | 0.43 | 0.43 |

As shown above the mixes had excellent workability with a low water-cement ratio. The resulting concrete had the following average compressive strengths (Standard cured 6×12 cylinders were tested):

| Mix Containing | Pounds Per Square Inch | |
|---|---|---|
| | 7 Days | 28 Days |
| Admixture A | 3136 | 4374 |
| Admixture B | 3101 | 4291 |
| Admixture C | 3420 | 4415 |

EXAMPLE II

An admixture was formulated by blending under ambient conditions: 950 grams Chicago tapwater; 10 grams diethanolamine; 15 grams dodecylbenzene sulfonic acid; and 25 grams lauryl dimethyl amine oxide. The admixture was incorporated into a cement mix having the following mix characteristics and ingredients:

| | |
|---|---|
| Cement—Portland Type I | 517.00 lbs. |
| Fine Aggregate—Sand | 1272.00 lbs. |
| Coarse Aggregate—Gravel | 1949.00 lbs. |
| Admixture | 4.50 fl.oz. |
| Water (added) | 27.50 gals. |
| Slump (consistency) | 3.00 in. |
| Air Content, by Volume | 5.70% |
| Weight of Fresh Concrete Per Cu. Ft. | 146.93 lbs. |
| Concrete Produced (Yield) | 27.00 cu.ft. |
| Cement Factor, Per Cu. Yd. | 5.50 sacks |
| Water-Cement Ratio | 0.44 by wt. |

The average compressive strength of the resulting concrete was 3,449 p.s.i. at 7 days and 4,456 p.s.i. at 28 days. The 7-day and 28-day compressive strengths are both significantly higher than normal concrete produced from mixes containing no air-entraining agent, and having the same slump, cement factor (sacks per cubic yard), and yield.

The same tests as Example II were made substituting lauryl di(2-hydroxyethyl) amine oxide for the lauryl dimethyl amine oxide. The results were substantially identical to those set forth above.

EXAMPLE III

A. A condensate was prepared from the following ingredients: 36 parts coconut oil fatty acids; 60.6 parts "polyglycolamine H-163"; and 25 parts dodecylbenzene sulfonic acid. The following procedure was used: The coconut oil fatty acids and the "polyglycolamine H-163" were reacted with agitation in a four-neck, 1-liter vessel for a 4-hour period.

During the initial part of the reaction an emulsion was formed which later cleared up. After the 4-hour period the material (fatty amide) was cooled to 80° C. and the dodecylbenzene sulfonic acid was reacted with the excess amine.

B. A condensate was prepared from the following ingredients: 36 parts coconut oil fatty acids; 30 parts diglycolamine; 30 parts diethanolamine; and 30 parts dodecylbenzene sulfonic acid. The following procedure was used: The coconut oil fatty acids and diglycolamine were reacted in a four-neck, 1-liter flask at a temperature of 150° C. for a 3-hour period under 27 inch Hg. vacuum. The condensate was then cooled to 70° C. and the dodecylbenzene sulfonic acid was then added along with the diethanolamine.

C. Admixtures of the condensates of A and B above were formulated which consist of 5 percent of the condensate, 5 percent of a mix of monoethylene glycol monomethyl ether, dipropylene glycol monomethyl ether and tripropylene glycol monomethyl ether and 90 percent Chicago tapwater. These admixtures are denoted as admixtures A and B respectively.

D. Three batches of mix of the following proportions were made for test purposes:

MIX DESIGNATIONS

| | | | |
|---|---|---|---|
| Cement—portland type I, lbs | 517.00 | 517.00 | 517.00 |
| Fine aggregate sand, lbs | 1,420.00 | 1,279.00 | 1,291.00 |
| Coarse aggregate gravel, lbs | 1,882.00 | 1,957.00 | 1,974.00 |
| Admixture A, fl. oz | | 5.50 | |
| Admixture B, fl. oz | | | 4.20 |
| Water (added), gals | 32.45 | 27.23 | 26.13 |
| Slump (consistency), in | 3.00 | 3.00 | 3.00 |
| Air content, percent by volume | 1.40 | 5.50 | 5.40 |
| Weight of fresh concrete, lbs. per cu. ft | 151.46 | 147.41 | 148.14 |
| Concrete produced (yield), cu ft | 27.00 | 27.00 | 27.00 |
| Cement factor, sacks per cu. yd | 5.50 | 5.50 | 5.50 |
| Water-cement ratio by wt | 0.52 | 0.44 | 0.42 |

These mixes produced concrete having the following average compressive strengths (Standard cured 6 inch × 12 inch cylinders were tested).

| Mix Containing | Pounds Per Square Inch | |
|---|---|---|
| | 7 Days | 28 Days |
| No air-entraining agent | 3118 | 4350 |
| Admixture A | 3420 | 4415 |
| Admixture B | 3331 | 4309 |

This data shows that an admixture containing all primary amide and amine salt produces a significant increase in strength over normal concrete having the same consistency. Composition B containing a primary amide and an amine salt resulted in a concrete of desirable air content for freeze-thaw stability with compressive strength approximately the same as normal concrete.

EXAMPLE IV

A condensate was prepared from 600 parts of coconut oil fatty acids by reacting with 300 parts diglycolamine and 300 parts diethanolamine, followed by neutralizing a portion of the excess amine with 400 parts of linear alkylate sulfonic acid (LAS), a biodegradable alkyl aryl sulfonic acid. The condensate was prepared by reacting the amines with the coconut oil fatty acids for a period of 4 hours at a temperature of 140° C. at atmospheric pressure. The condensate was then cooled to 70° C. and the sulfonic acid added. Fifty parts of the above condensate were then added to 950 parts of Chicago tapwater to form an admixture, designated as Admixture IV. The performance of this admixture prepared according to the invention was compared with the performance of two commercially available air-entraining admixtures, designated as Admixtures I and II. Admixture I contains fatty acid secondary amine salts and a salt of an alkyl aryl sulfonic acid. Admixture II consists essentially of sulfonated hydrocarbons. Test data were obtained by adding increments of ½ ounce of admixture per sack to a concrete mix consisting of:

| | |
|---|---|
| Cement—Portland Type I | 517.00 lbs. |
| Fine Aggregate—Torpedo Sand | 1269.00 lbs. |
| Coarse Aggregate—Gravel | 1942.00 lbs. |
| Water (added) | 28.46 gals. |

Tests were made in accordance with the methods prescribed in A.S.T.M. Designation C233-63T, Tentative Method of Testing Air-Entraining Admixtures for Concrete. The results of these tests are shown in the graphs of FIGS. 1–3. The 7-day and 28-day compressive tests for the admixture of the invention consistently exceeded the compressive strengths of the commercially available admixtures throughout the normal range of usage. Other tests show that Admixture IV is stable to hydrolysis and gives excellent freeze-thaw stability.

The foregoing description of the invention and its various advantages refers to the use of the inventive admixtures with mixes including cement, aggregate, and water. It is to be understood that other additives may be included in cement mixes prepared in accordance with the invention for the purposes for which they are normally employed. Such other additives include pozzolanic materials, coloring materials, fly ash, and chloride accelerators.

Obviously, many modifications and variations of the invention as hereinbefore set forth may be made without departing from the spirit and scope thereof, and therefore only such limitations should be imposed as are indicated in the appended claims.

I claim:

1. A method for improving workability of concrete mixes and improving the compressive strength and resistance to weathering of the resulting concrete, comprising: incorporating into a concrete mix from about ½ to 1½ fluid ounces per 94-pound sack of portland-type cement of an admixture including from about 1 to about 20 parts by weight of a surface active agent selected from the group consisting of oxides of tertiary amines having 10–18 carbons in one alkyl group and a combined total of 2–10 carbons in the other alkyl groups, primary polyglycolamides produced by reacting the nonhydroxy fatty acids of coconut oil with primary polyglycolamines selected from the group consisting of diglycolamine and diethylene isopropyl glycolamine, and mixtures thereof; from about 2 to about 30 parts by weight of an anionic detergent; and from about 40 to about 95 parts by weight of a solvent to assure uniform dispersion of the admixture ingredients throughout the batch of concrete being treated.

2. The method of claim 1 wherein the solvent is selected from the group consisting of water, monopropylene glycol monomethyl ether, dipropylene glycol monomethyl ether, tripropylene glycol monomethyl ether, isopropyl alcohol, and mixtures thereof.

3. The method of claim 1 wherein the solvent is water.

4. The method of claim 2 wherein the solvent consists of a major portion of water and a minor portion of dipropylene glycol monomethyl ether.

5. The method of claim 2 wherein the solvent consists of a major portion of water and a minor portion of isopropyl alcohol.

6. The method of claim 1 wherein the tertiary amine oxide is lauryl di(2-hydroxyethyl)amine oxide.

7. The method of claim 1 wherein the amine oxide is lauryl dimethyl amine oxide.

8. The method of claim 1 wherein the primary polyglycolamine is diglycolamine.

9. The method of claim 1 wherein the primary polyglycolamine is diethylene isopropyl glycolamine.

10. The method of claim 1 wherein the anionic detergent is an amine salt of an alkyl aryl sulfonic acid wherein the aryl group is selected from the group consisting of benzene and naphthalene, and the alkyl group contains from 9 to about 20 carbons.

11. The method of claim 10 wherein the anionic detergent is produced by reacting the sulfonic acid at least in part with an excess of primary polyglycol amine.

12. The method of claim 10 wherein the anionic detergent is the amine salt of dodecylbenzene sulfonic acid.

13. The method of claim 10 wherein the anionic detergent is the amine salts of tridecylbenzene sulfonic acid.

14. The method of claim 10 wherein the anionic detergent is the amine salt of linear alkylate sulfonic acid.

15. The method of claim 1 wherein: the primary polyglycolamide is the reaction product of coconut oil fatty acids and diglycolamine; the anionic detergent is the diethanolamine salt of dodecylbenzene sulfonic acid; and the admixture comprises 5 percent of a mixture of the amide and the detergent, 90 percent water and 5 percent polyoxyethylene glycol monomethyl ether.

16. A method for improving workability of concrete mixes and improving the compressive strength and resistance to weathering of the resulting concrete, comprising: incorporating into a concrete mix from about ½ to 1½ fluid ounces per 94-pound sack of portland-type cement of an admixture including from about 1 to about 20 parts by weight of a tertiary amine oxide selected from the group consisting of lauryl di(2-hydroxyethyl) amine oxide and lauryl dimethyl amine oxide; from about 2 to about 30 parts by weight of an anionic detergent selected from the group consisting of the amine salt of dodecylbenzene sulfonic acid, the amine salts of tridecylbenzene sulfonic acid and the amine salt of linear alkylate sulfonic acid; and from about 40 to about 95 parts by weight of a solvent selected from the group consisting of water, monopropylene glycol monomethyl ether, dipropylene glycol monomethyl ether, tripropylene glycol monomethyl ether, isopropyl alcohol, and mixtures thereof.

* * * * *